(12) United States Patent
Holmen (10) Patent No.: US 6,347,767 B1
(45) Date of Patent: Feb. 19, 2002

(54) METHOD OF AND APPARATUS FOR DETECTION OF ICE ACCRETION

(75) Inventor: Hans Kristian Holmen, Vøyenenga (NO)

(73) Assignee: Futuris AS., Asker (NO)

( * ) Notice: Subject to any disclaimer, the term of this patent is extended or adjusted under 35 U.S.C. 154(b) by 0 days.

(21) Appl. No.: 09/530,647

(22) PCT Filed: Oct. 14, 1998

(86) PCT No.: PCT/NO98/00311

§ 371 Date: May 3, 2000

§ 102(e) Date: May 3, 2000

(87) PCT Pub. No.: WO99/28185

PCT Pub. Date: Jun. 10, 1999

(30) Foreign Application Priority Data

Nov. 5, 1997 (NO) .................................................. 975092

(51) Int. Cl.[7] .............................................. B64D 15/20
(52) U.S. Cl. .................................................. 244/134 F
(58) Field of Search ........................ 244/134 R, 134 F; 340/588, 580, 581

(56) References Cited

U.S. PATENT DOCUMENTS

| | | | | |
|---|---|---|---|---|
| 3,596,264 A | * | 7/1971 | Ciemochowski | 340/581 |
| 4,222,044 A | * | 9/1980 | Boschung | 340/581 |
| 4,365,131 A | * | 12/1982 | Hansman, Jr. | 244/134 D |
| 4,882,574 A | * | 11/1989 | Khurgin | 340/581 |
| 4,980,673 A | * | 12/1990 | Kleven | 340/581 |
| 5,354,015 A | * | 10/1994 | Meador | 244/134 F |
| 5,474,261 A | * | 12/1995 | Stolarczyk et al. | 244/134 F |
| 5,686,841 A | * | 11/1997 | Stolarczyk et al. | 244/134 F |
| 5,790,026 A | * | 8/1998 | Lardiere, Jr. et al. | 340/581 |

* cited by examiner

Primary Examiner—Charles T. Jordan
Assistant Examiner—Tien Dinh
(74) Attorney, Agent, or Firm—Young & Thompson

(57) ABSTRACT

Apparatus for detecting conditions that involve a risk of ice formation on the surface of aircraft in movement, based on temperature measurement, includes two temperature measuring elements disposed at the surface in points having different air pressures, a device for recording the change of the temperature difference between the points with time, and a device for detection and corresponding indication based on the recording, and at least one temperature measuring element for absolute temperature.

13 Claims, 7 Drawing Sheets

METHOD OF AND APPARATUS FOR DETECTION OF ICE ACCRETION

BACKGROUND OF THE INVENTION

This invention generally relates to detection of conditions involving a risk of ice formation on the surface of aircraft in movement, based on temperature measurement. More specifically the invention comprises both a method and an apparatus in various embodiments, intended to avoid the problems represented by such ice formation.

When there is referred to aircraft here, there is in the first instance the question of airplanes and secondly other forms of aircraft, including helicopters, which also to a high degree can be subject to icing. In particular icing on the helicopter rotor can be very dangerous.

DESCRIPTION OF THE RELATED ART

Previously there are many proposals directed to the detection of ice layers being deposited on the surface of aircraft. Examples of known methods of interest in this respect, are U.S. Pat. No. 5,521,584 and perhaps in particular U.S. Pat. No. 5,313,202.

U.S. Pat. No. 5,313,202

The patent specification takes as a starting point that the aircraft part collides with undercooled water drops existing in the air space where the part is moving. The collision results in attachment of the water drops to the aircraft part and the drops are converted into ice as a consequence of this collision. When the water freezes to ice energy is liberated in the form of heat so that the ice will have a temperature higher than the environment while the ice is formed. Ice is formed at 0° C. This region of the aircraft part that is being covered with ice or that has been covered with ice still not being completely frozen out, therefore will have a temperature that is higher than the environment and accordingly also higher than the regions still not being covered by ice. This difference in temperature, between for example the leading edge of a helicopter rotor being in a process where ice is built up—and portions of the same rotor where still no ice has attached, according to the patent specification can be recorded by means of a particular contact-free detector that records the difference in infrared radiation from the regions with ice in relation to the radiation from the ice-free regions.

Nowhere in the patent specification it is mentioned that freezing can commence in front of the aircraft part, and the sensitivity of an IR detector as shown, will not be suitable in order to measure the influences on the aircraft part from temperature differences due to freezing of very small droplets of undercooled water in the air space outside the actual aircraft part—i.e. droplets being too small to be able to attach to the aircraft part by the freezing-out. Therefore the solution can not be employed for warning about any risk of icing.

U.S. Pat. No. 5,521,584

This known method is intended for recording that ice has been formed or is during formation, in particular on airfoils when the aircraft stands on the ground. The purpose is to save time-consuming inspection in order to decide whether or not the aircraft has to be deiced, before take off.

The functioning of the method is based upon the fact that ice has an insulating effect: After having been high in the air aircraft and the contents of fuel tanks, being often localized in the airfoils, may have been cooled to below the freezing point of ice. If there is mild air with a high moisture content at the place where the aircraft has landed, the moisture can condense and freeze to ice on the airfoil at the regions concerned. At selected places where there can be a risk of icing, special sensors are attached to be able to measure the heat flow from the moist, warm air to the cooled aircraft part. As the aircraft part is covered by an increasingly thick ice layer, the heat flow will decrease because of the insulation effect of the ice. Heat flow and temperature picture make it possible to calculate the tickness of the ice being possibly formed. Thus, the pilot on the background of the measurements can decide in a simple manner whether or not deicing is required.

This form of icing is not of interest with respect to an aircraft during flight, and accordingly this known method in the form shown can not be employed for recording ice formation as a result of collision with undercooled rain in the air during flight, and still less be able to warn about any risk of such icing.

The patent specification and claims do not contain any indication to the effect that the inventor has contemplated this possibility.

Thus, methods being known hitherto have not been directed to providing a pre-warning regarding risk of icing being present. When an ice layer has started to be deposited, there can already exist risk factors which aircraft pilots are to a highest degree interested in avoiding. Accordingly, there is a great need for means for detecting conditions involving a risk of ice formation, before such ice formation is initiated. This invention therefore is directed to this task, and is based on temperature measurements as are also known methods for detecting an ice coating having actually been deposited.

SUMMARY OF THE INVENTION

In their broadest aspect the novel and specific features of the invention in the first place consist in that the surface temperature is measured with temperature measuring elements disposed in at least two surface points having different air pressures, that a recording of the change of the temperature difference with time between the points, is taken as a basis for the detection and a corresponding indication being presented to the pilot or crew of the aircraft, and that at least one temperature measuring element gives a measure of absolute temperature, that provides a check of the validity of the detection and the indication when the absolute temperature is between 0° C. and −55° C.

In addition to the main features just recited regarding the method according to the invention, there are stated further and subordinate method features in the claims. Moreover the invention comprises an apparatus for detection of conditions involving a risk of ice formation on the surface of the aircraft in movement, based on temperature measurement, as also stated in the claims.

In technical terms it is clear that the above recording of temperature difference/time changes, will be performed by means of a computer and that this after a suitable signal processing will deliver control or output signals to for example an instrument panel that can be observed by the aircraft crew, for indications, alarm or warning to the effect that the conditions at one or more surface portions of the aircraft involve risk of ice formation. Accordingly, necessary action can be taken in due time, for example by adequate maneuvering or activation of deicing equipment.

By means of the invention it is possible for example for a passenger airplane pilot to follow the development of the relevant temperature relationships through several minutes before the instant when icing will start. For aircraft with a velocity of several hundred kilometers per hour this means that warning about risk of ice formation can be indicated several tens of kilometers beforehand. The significance of this can not be over-estimated.

The invention is based in part on a new understanding regarding the mechanisms or processes that occur immediately adjacent to the surfaces of aircraft in movement, and in the following description these relationships will be discussed further. In general regarding meterological relationships of interest in this connection, reference is here made to the book "Vær og klima i farger" (title in English: Weather and climat in colours) by Petter Dannevig and Svante Bodin, H. Aschehoug & Co., Oslo 1978, see in particular page 105 pp in the book.

When an aircraft moves through the air, there will be local variations in the relative velocity between the air molecules and the various parts of the surface of the aircraft—depending on the shape and the manner of its movement. In particular the leading edge of the airfoil and tail rudder profiles as well as the propeller, and on helicopters: the main rotor and the tail rotor, are regions of interest. In technical terminology these regions are designated stagnation regions, i.e. the regions of the aircraft being oriented at right angles to or close to right angles to the direction of movement. Here there will be a damming up of air molecules that will result in a pressure increase in relation to the stationary ambient pressure,—in a popular sense because of the fact that the air molecules in this region need time in order to be accelerated from standstill to approximately the velocity of the aircraft. This pressure increase will lead to an adiabatic temperature increase that in dry air at for example 500 km/h theoretically will be about 10° C.

The frictional work between the air and the surface of the aircraft also contributes to an increase in temperature. Near the stagnation region this contribution will be modest, but in the regions where the relative velocity corresponds to the velocity of the airplane, the temperature increase due to the frictional work will be of the same order of magnitude as from the pressure damming. During normal flight there will also be a higher pressure on the underside of the airfoils than on the upper side. This pressure difference will also result in a corresponding temperature difference. The various contributions that have influence on the temperature, result in a temperature profile that can be mapped by recording the temperature distribution on the surface of the aircraft. The results from the various contributions mentioned above, will be influenced by the flight conditions of the aircraft, i.e. by the velocity, by the angle of attack at the airfoils, by the motor power etc. For airplanes with fixed airfoils also the use of slots, flaps and so forth will have an influence on the temperature profile.

If the air contains water vapor or gases having other physical properties than air, the temperature profile will be altered in relation to the profile for clean, dry air. Pressure changes and frictional resistance will also be the cause of turbulence in the space around the aircraft. If there are undercooled water drops in the air, the freezing of these may be initiated in consequence of the turbulence, the quick temperature changes and the pressure damming in front of the aircraft. Formation of ice from the water droplets normally takes place at about 0° C. (the freezing temperature is somewhat dependent on the pressure), and at the phase transition from water to ice, there will be liberated a large amount of energy per unit of water content. If the water is undercooled portions of this energy will be consumed for heating the water, but some of the energy will also gradually be supplied to the air surrounding and between the water droplets. Freezing of undercooled water therefore will result in an increase of the temperature in relation to the temperature before the start of the process.

At the outsets before freezing-out commences, there can not be any significant temperature differences between the water droplets and the surrounding air. When freezing starts the energy from the phase transition will be liberated in the water, which therefore rather instantaneously will get an increase in temperature up towards 0° C. In this way there will be established during a short time a temperature difference between the water that freezes and the surrounding air, and there will be initiated a heat flow from the water to the air. The heat flux between the water and the air will be a function of the size of the water droplets and of their number per volume unit—as well as of the density (pressure) of the air at the location.

If the undercooled water droplets are small and if the amount of these is limited, the transition heat may as a whole be taken up by the water droplets and the surrounding air. If the droplets are larger than a critical minimum size, possibly with a sufficiently high density of droplets, it is not possible to consume or distribute all freezing energy sufficiently quickly. Therefore the droplets will be hit by the stagnation surfaces before they have become ice; they will be of a "slurry consistency" and can now freeze to compact ice at contact with the cooled parts of the flow profile, or at contact with ice that has already attached to the aircraft.

When icing occurs during flight the aggregation always commences at the stagnation regions and the ice then grows outwards from this region. When icing has started the shape of the profile can be changed as the thickness of the ice increases, and the airfoil and tail profiles can be altered so that both the carrying capacity and the maneuvring properties will be highly depreciated or destroyed. Besides with the altered shape there can also be formed other and new stagnation surfaces and regions where the ice can also build up.

Undercooling and freezing-out of ice can comprise specific mechanisms or processes. It is a common notion that the freezing point of water and the melting point of ice has the same temperature value. This however, is only valid when large water surfaces are concerned. When there is a question of very small droplets, the freezing must be initiated. In a way this is analogous to the fact that condensation nuclei are required in order to form water drops from vapor. Without the presence of freezing nuclei that can start the freezing process and without kinetic or thermal disturbances, the water can remain undercooled during a long time, in particular if the air temperature is not lower than about −12° C. Exceptionally there has been found undercooled water down to about −40° C. Sudden temperature or pressure changes, for example as a result of turbulence from an airplane moving through the undercooled water droplets, can trigger the freezing process. It is believed that there is less need for triggering the freezing-out the more undercooled the droplets are—and the larger they are. The end temperature can be calculated if the air pressure, the amount of undercooled water and the initial or starting temperature are known. Conversely if the air pressure, the initial and the end temperatures are known, it is possible to determine the amount of undercooled water. Calculations have shown that if there are only small amounts of undercooled water, all the heat liberated will not be sufficient for bringing the end temperature locally higher than 0° C. This means that there will not be any icing risk for airplanes, since the water droplets will be transformed into ice before the airplane collides with them.

If on the other hand the amount of undercooled water increases, it will take a longer time to bring away the heat liberated, and all the water will not freeze to ice before the airplane hits the droplets. The droplets will now be in a mixture of ice and water, i.e. a type of adhesive slurry that can attach to airfoils, tail surfaces etc. and icing conditions are present. If airfoil surfaces, tail surfaces and so forth beforehand have temperatures below 0° C., they can take up residual heat so that the water freezes to ice and will be well attached to the surfaces concerned. Note in this connection that the formation of ice from a given amount of water requires that the same energy is transported away from the water as what is needed for cooling the same amount of water by about 80° C.

BRIEF DESCRIPTION OF THE DRAWINGS

Additional explanations in connection to the above and the solutions according to the invention will appear from the following description with reference to the drawings, where.

DESCRIPTION OF THE PREFERRED EMBODIMENTS

Figure 1:
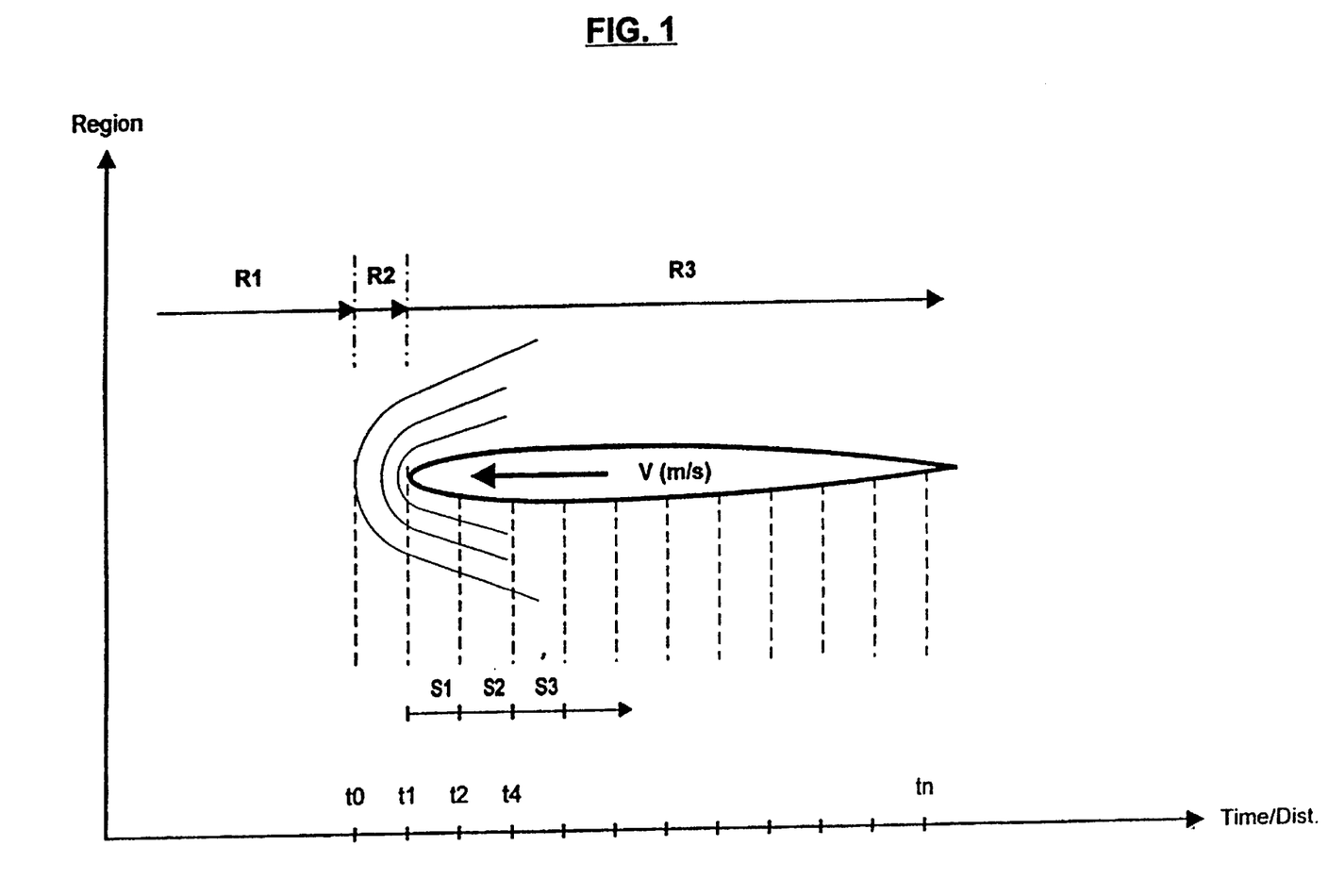
FIG. 1 schematically and in cross section shows an airfoil-shaped airplane part with an accompanying diagram for explaining air flow, pressure and temperature relationships of significance for the invention, FIG. 2 in part shows the airplane part in FIG. 1 and besides more in detail the temperature consequences of the processes appearing from FIG. 1.

FIG. 1 as an example shows a situation where a part of an aircraft being subjected to icing (for example an airfoil, a helicopter rotor blade or other parts) moves at a velocity V (m/sec.) through an air space where the air is quiet or moves at a substantially constant velocity in relation to the surface of the earth. Thus, there will be a region R1 in FIG. 1 in front of or ahead of the aircraft where there will not be any significant turbulence. If the temperature is low in this region, there may occur undercooled water droplets in this region during a long time period.

Adjacent to the part of interest of the aircraft there will be a region R2 where pressure damming or compression will take place and therefore also temperature changes that may initiate freezing-out in possible undercooled water droplets. This is where freezing starts. First some ice will be formed in the water droplets at the same time as significant amounts of phase transition energy is liberated from the ice crystals, practically speaking instantaneously when the ice is formed. Provided that the undercooled water has a higher temperature than –80° C., i.e. always under practical conditions, the amount of energy being liberated will be so large that only portions of the water can be frozen out to ice at about 0° C., i.e. at a higher temperature than the water droplets and the air had in region R1.

Subsequently some time will elapse before the temperature difference between the water-ice droplets and the cooled air will be equalized. The time needed for this is a function of how many drops there are per unit volume of the air, and of how small the droplets are, of how strong the turbulence is in the region and of the initial temperature of the undercooled water and the air. Many small droplets will have a larger effective surface per unit volume of the water than fewer or larger water drops, and the heat exchange accordingly will take place more quickly. This heat exchange will start in region R2, but will to a substantial degree take place in region R3 in FIG. 1.

Figure 2:
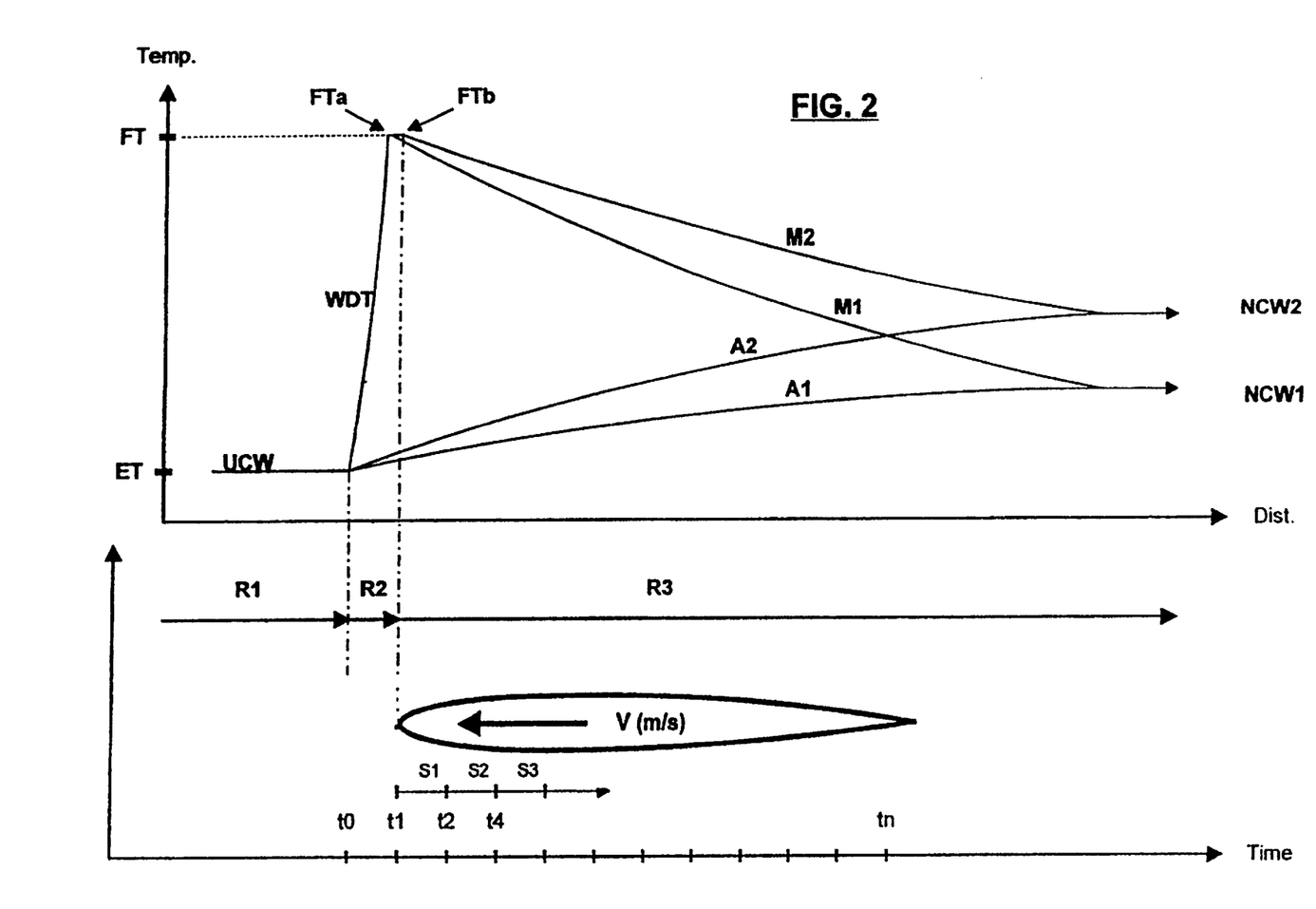

FIG. 2 illustrates the temperature consequences of the process as shown in FIG. 1 for the cases where there are only smaller or possibly only very small undercooled water droplets in the air. At the upper portion of this figure the indication ET at the ordinate axis depicts the initial, undercooled temperature, and FT indicates the freezing temperature of the water, i.e. approximately 0° C.

The curve portion WDT shows the temperature-time development in the water-ice mixture while the ice is formed. The temperature in this example has increased from UCW (ET) to FT up to the position FTa, i.e. before the aircraft collides with the water droplets containing ice crystals. It appears from the example that the temperature of the water has already started to decrease below 0° C. before the aircraft hits these droplets. This critical point occurs at FTb.

If most of the water has been converted to ice before it collides with the aircraft, the ice will not be able to attach to the aircraft and can not represent any hazard. The curves M1 and M2 show the temperature in the ice and the residual water during freezing-out along with equalization of the temperature difference between water and air because of heat exchange. Curve M1 represents the course of events if the undercooled water droplets are very small, whereas M2 shows the development when the size of the water drops are at the limit of being able to attach when hit by the aircraft (risk limit for icing).

Curves A1 and A2 in a corresponding manner show the change of air temperature as a result of the heat exchange between air and undercooled water having had a temperature increase upon initiation of ice freezing. The surface temperature of the aircraft will adjust itself depending on the temperature profiles A1 and A2 as a consequence of the heat exchange that will take place.

Figure 3:
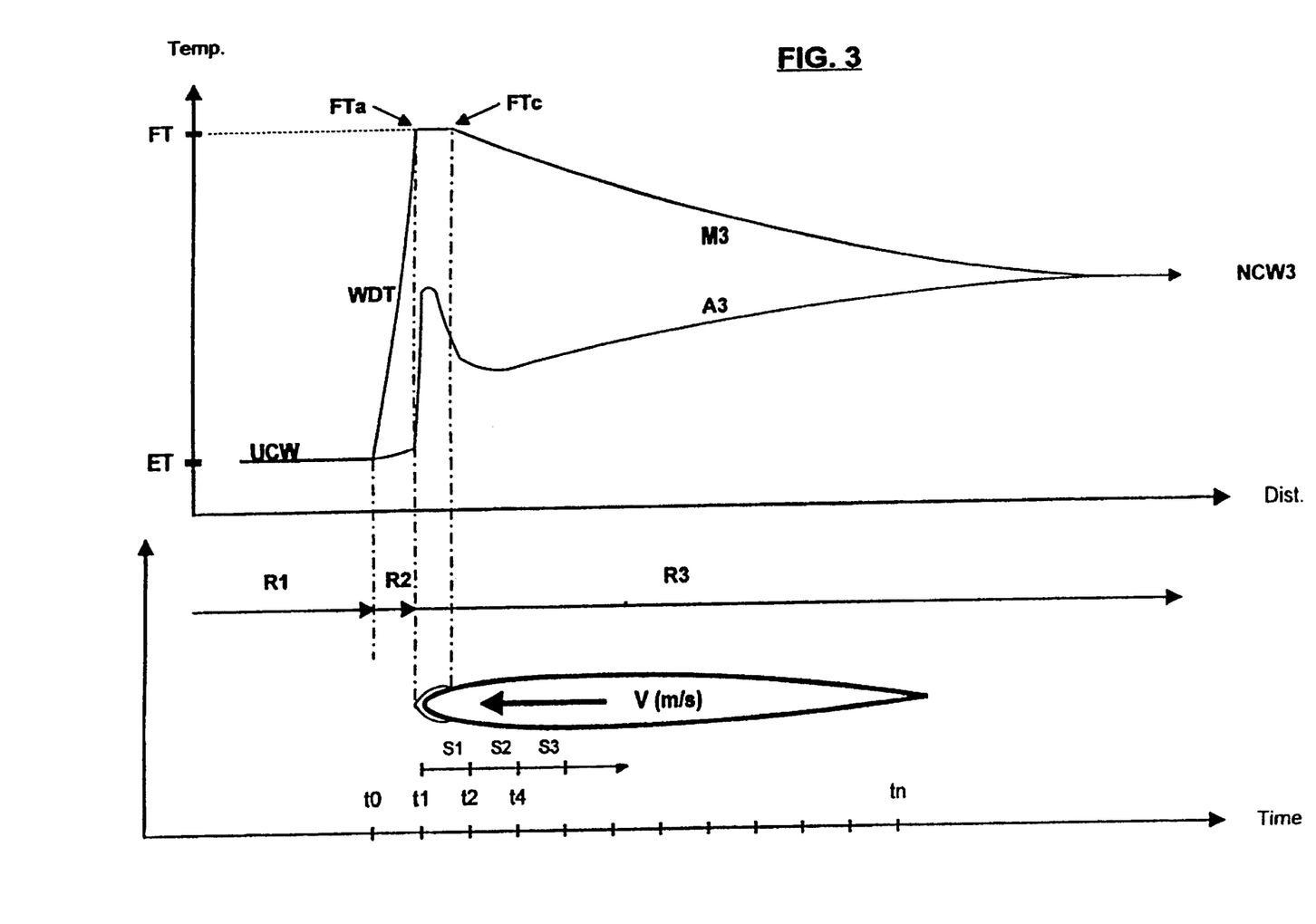
FIG. 3 is a schematic illustration as FIG. 2, but with a situation where there are larger undercooled water drops in the air, FIG. 4 schematically in association with the situation in FIG. 2, shows how measurement and detection of risk of icing can be performed according to the invention, FIG. 5 in a similar way as FIG. 4 and in association with FIG. 3, shows a method according to the invention.

FIG. 3 shows the result of water drops being so large that freezing-out has only been partially finished before the aircraft hits the mixture of ice and water in a sort of adhesive slurry consistency. The slurry will first adhere to the areas where the relative velocity is low, i.e. in the so-called stagnation regions. At the outset the temperature of the aircraft will be somewhat higher than the UCW temperature. As previously mentioned the heating is due to the adiabatic pressure and temperature increase because of the relative velocity of the aircraft. If the surface temperature of the aircraft is lower than FT (about 0° C.), the freezing of ice will liberate portions of the surplus energy to the aircraft, and the building-up of ice will speed up unless deicing is performed. This can develop into a dangerous situation. In FIG. 3 such a situation is shown. Other references and symbols are as in FIG. 2. The curve relating to the water-slurry temperature is depicted M3 and for air A3.

Figure 4:
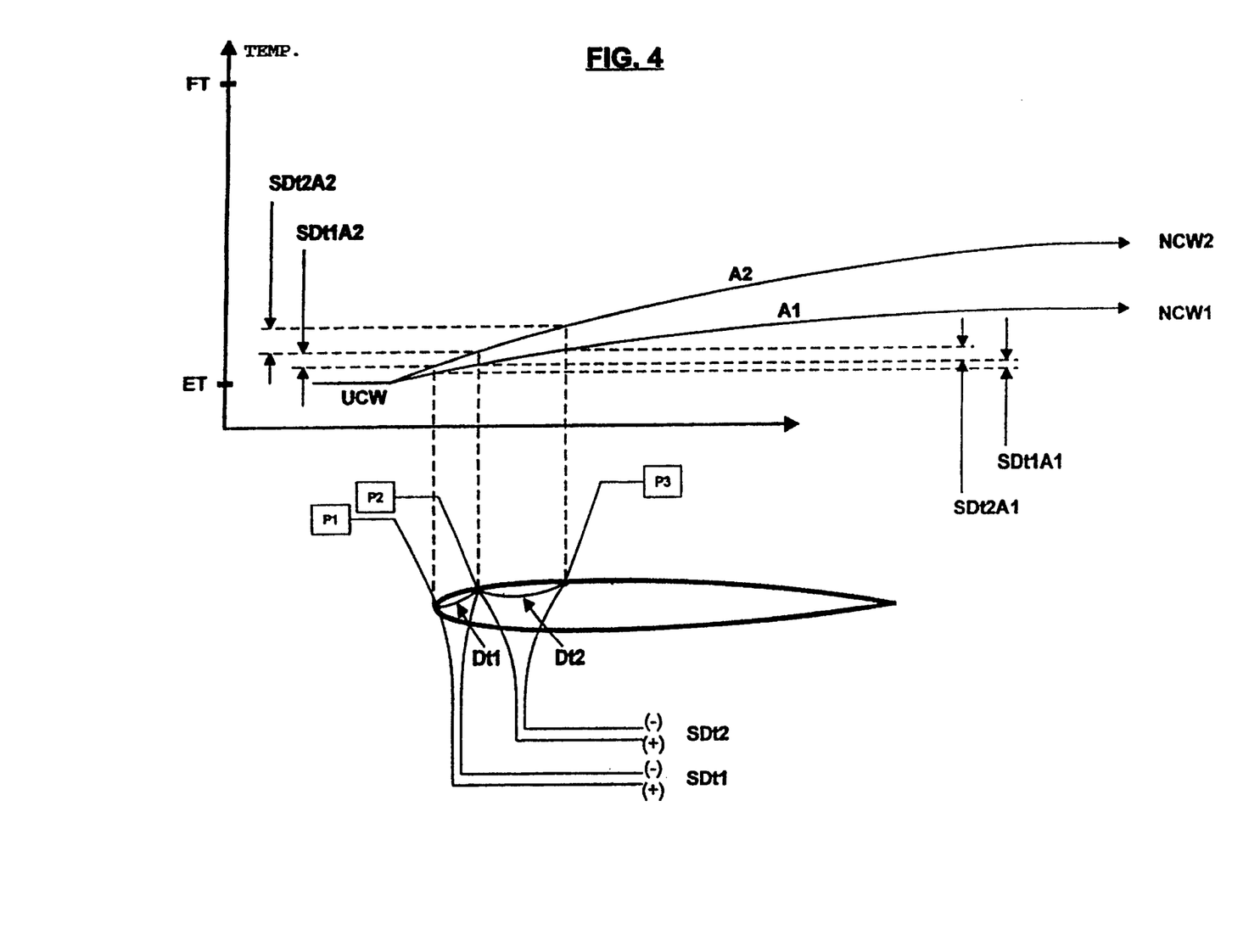

In FIG. 4, that must be considered together with FIG. 2, there is shown how the influence from freezing-out of undercooled water can be measured, and how the "signature" of the temperature curve can say something about the drop size, and thereby about the risk level. A risk-free level of the distribution of the size of the undercooled water droplets, can be interpreted from the measurement signals from two (possibly from more) differential thermoelements Dt1 and Dt2 located in the principle as shown in FIG. 4, if the temperature profile is like the one for curve A1. The signal levels from the differential thermoelements will deviate by SDt1A1 and SDt2A1 respectively, i.e. there will only be relatively small deviations from the "normal temperature difference" that can be observed when the aircraft moves in dry air. Correspondingly it is shown that when the drop size increases the deviations from the normal values will also increase, see curve A2 and the signals SDt1A2 and SDt2A2.

When there is here the question of normal value or the "normal", this applies to a normal situation with respect to the aircraft concerned, or more specifically the part of interest thereof. The normal situation is also determined by the aircraft's velocity, altitude and conditions relating to climbing or desending and other parameters that can characterize the actual flight situation and thereby the air flow conditions adjacent to the airplane parts or surface portions concerned. Under such given conditions the parameters of the normal situation can be determined empirically or they can be calculated, depending among other things on the surface geometry at the aircraft part concerned.

Since the location P1, P2, P3 of sensors as shown in FIG. 4, normally will give a negative signal from Dt1 and Dt2, the signal values will approach 0° C.—the more the larger amounts of undercooled water drops that freeze per time unit. The number of drops per unit volume of air will only have a small variation, which means that a larger deviation from the normal value indicates larger drops and a higher risk of icing. Smaller deviations from the normal signal values in the principle means that there are undercooled water drops in the air, but that for the moment there is no immediate danger. The logging (recording) of deviations with time will form a basis for a trend analysis, and thereby the system can be employed for pre-warning of ice formation. With such recording of the time development of temperature differences between surface points P1, P2, P3 a basis is established for detection and corresponding indication being presented to the aircraft pilot or crew. This will be explained more closely below with reference to FIGS. 6 and 7.

Figure 5:
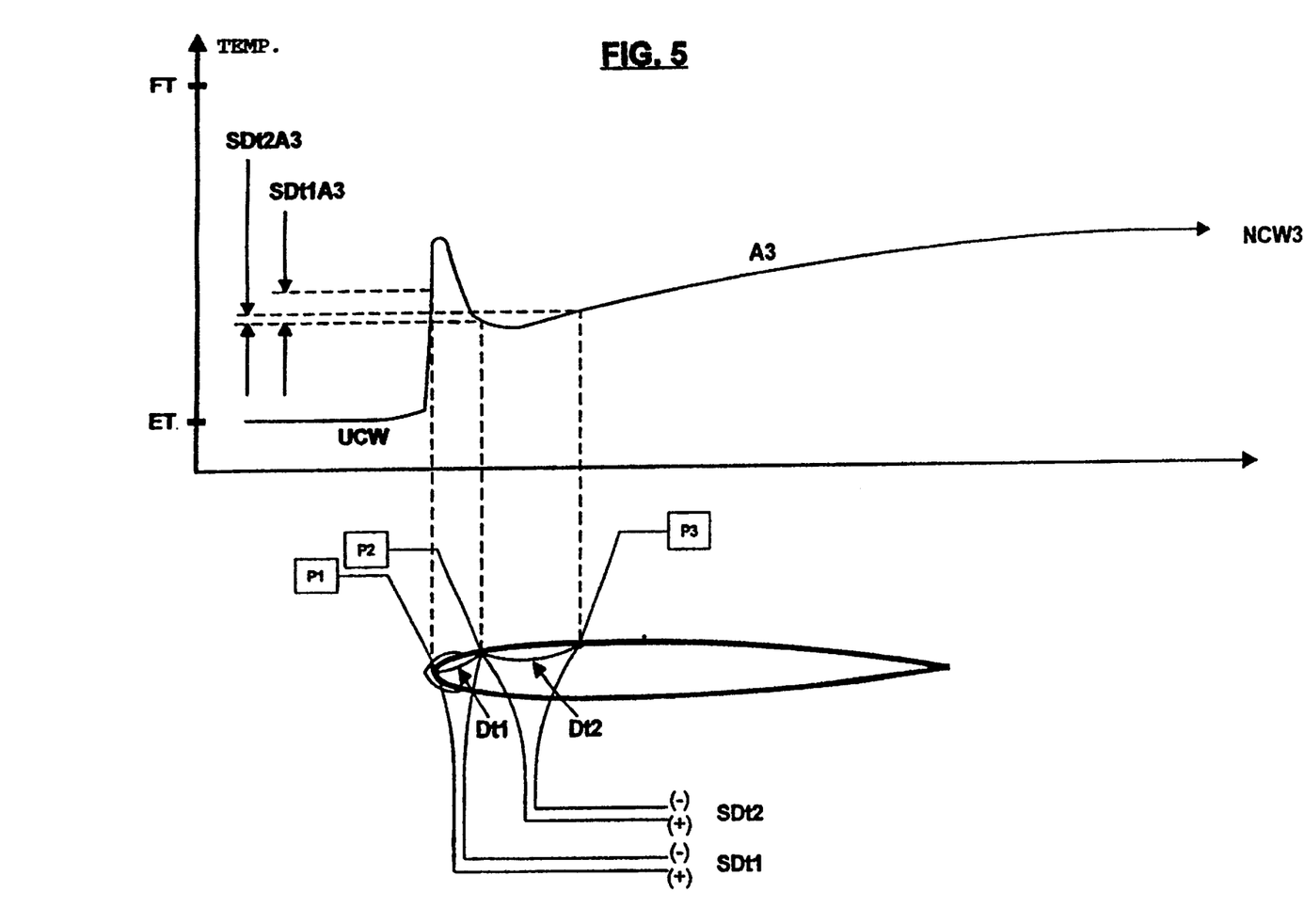

In FIG. 5, that is to be considered together with FIG. 3, there is shown how the deviations from a normal signal level will be when ice starts to build up on the aircraft. The most obvious feature is that the heat being liberated from ice formation from the leading end of Dt1 (at stagnation point P1), will give a clear, positive signal that can be easily recognized. (SDt1A3).

Figures 7, 7A:
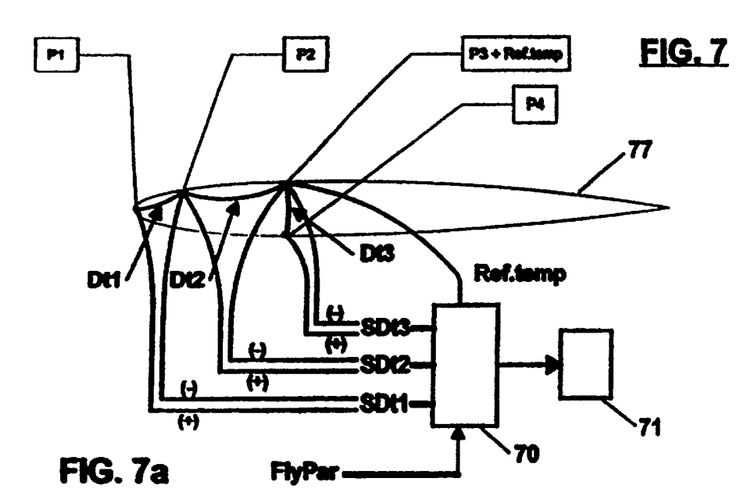

In FIGS. 4, 5 and 7 are shown the regions P1, P2 and P3 where the differential thermoelements have their sensitive points. Besides in FIG. 7a there is shown an example of a possible position of a differential thermoelement Dt3 that will detect or record the temperature difference between the underside and the upper side of for example the airfoils of the aircraft, i.e. the temperature difference between P3 and P4 in FIG. 7a, where the pressures will be different. The differential thermoelement Dt1 can serve to deliver a warning regarding ice having formed in region P1, but according to the invention will in particular serve as an indicator to the effect that there is a risk of icing as long as region P1 is free of ice. Region P1 should preferably be adjacent to or most desirably in a stagnation region. Region P2 must be at a position different from P1, along a flowline (downstream) on the aircraft, or at a location being representative of the conditions along the flowline and downstream of P1. The differential thermoelement Dt2 will have as its task to warn about accentuated or new risk of icing also subsequent to the possible covering of P1 with ice.

According to the invention it is an advantage for a signal interpretation being as secure as possible, that also the absolute temperature is measured at least in one of the regions P1, P2, P3 or P4. See "Ref" in FIG. 7d where for example there can be used a resistance thermoelement of the type Pt100.

As regards the length and other dimensions of the differential thermoelement or thermoelements required, these should be determined on the basis of knowledge of aerodynamic conditions at, and to possible mounting positions at each type of aricraft where the system is of interest.

The instrumentation described here comprises passive sensors (thermoelectric elements), that do not require any supply of power. The mounting of the sensors can be underneath the outer skin of the aircraft, this being most often made of aluminum that is a well heat-conductive material. Accordingly there is no need for holes or bores for mounting the sensors. If necessary the sensors can be made so thin and in such a manner that they can be mounted at the outside of the outer skin. There are practically no limits to which parts of an aircraft that can be equipped with this type of instrumentation. Also propeller blades and helicopter rotors can be provided with instruments in such a way. In addition to the fact that the type of sensors concerned can be disposed or mounted in a very simple manner, they are also very robust so that they can withstand vibrations and high mechanic strain that can occur in aircraft.

Figure 6:
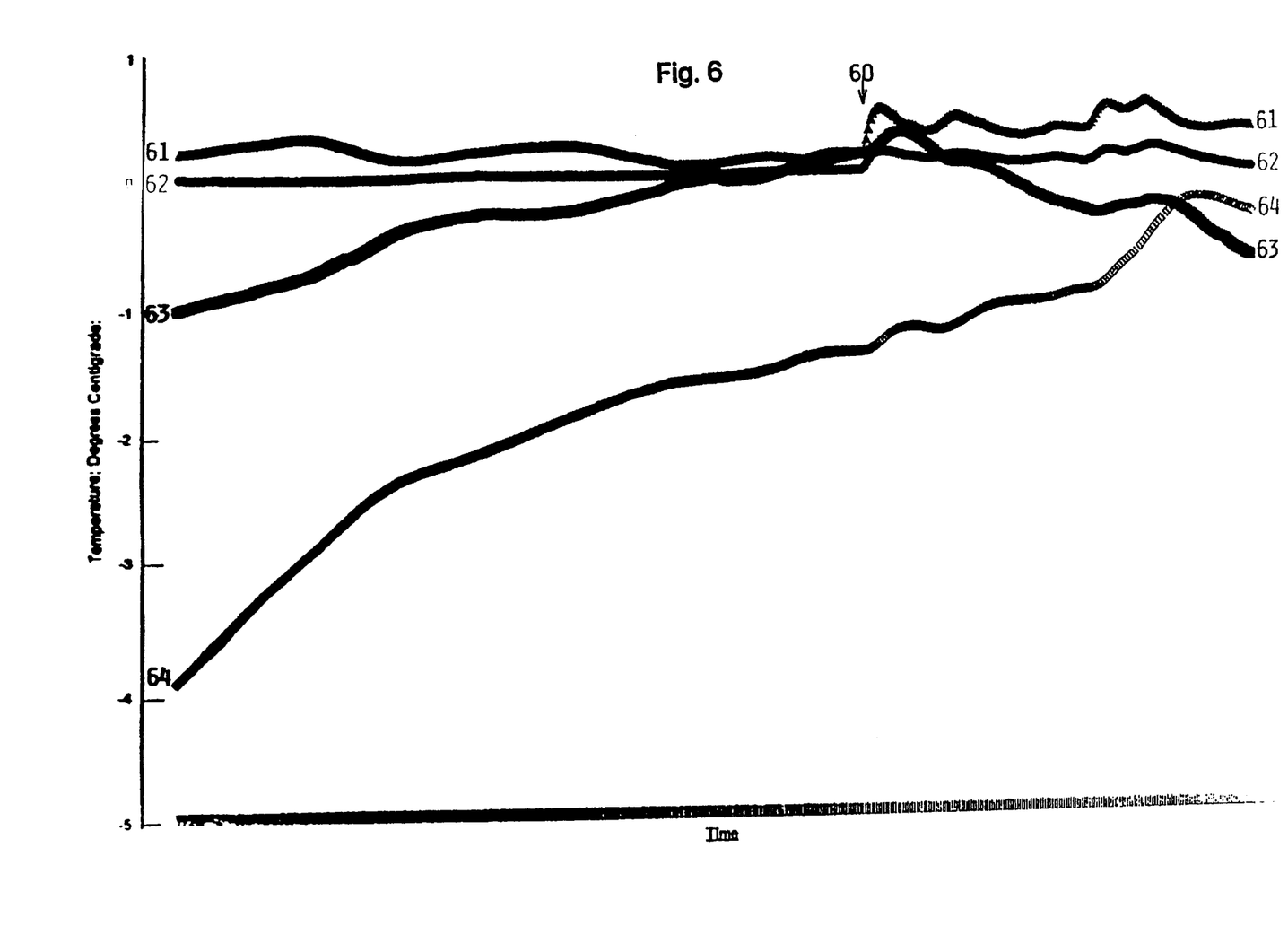
FIG. 6 is an example of a typical temperature-time development with four differential thermoelectric elements on an airplane wing, before and during ice deposition thereon, and FIGS. 7a–d schematically show some examples of positioning and structure of differential thermoelements on an airplane part.

In FIG. 6 real signals are shown from four differential thermoelements mounted on an airfoil. Altogether four signals are shown: The uppermost of the signals 61 start from a value over 0 (relativ difference signal). This signal comes from a sensor being located approximately as Dt1. The next signal 62 starts very close to 0. This comes from a sensor element that is also located approximately as Dt1, but at the underside of the wing. Signal 63 comes from a differential element being located approximately as Pt2 at the upper side, and signal 64 comes from a corresponding element located at the underside, measured in relation to 63, see Dt3 and SDt3 in FIG. 7a. It is to be noted that the signals describe a curve converging broadly towards zero, until the point being indicated with an arrow 60, where icing takes place at the leading edge of the wing. From the converging of measurement values mentioned here or curves 61–64, and with knowledge of the aeronynamic conditions (the normal situation) of the airplane as well as heat capacities and so forth for air, water drops and ice, it is possible to precalculate and thereby give a pre-warning of risk of icing. Necessary means for this are explained below with reference to FIG. 7.

In addition to the course or development of the signal values from one or more differential thermoelements having various locations, there is involved a measurement of absolute temperature T. This does not change much, but decreases somewhat with time until strong icing occurs, and then increases slowly afterwards. As a sole indication the measurement of the absolute value of the temperature would be unsuitable for warning about risk of icing.

FIG. 7 shows examples of the structure of the differential thermoelements. In order to obtain a high sensitivity several differential thermoelements have been combined, each consisting of a bimetallic configuration. FIG. 7a shows a possible fundamental location. There may also be contemplated locations after Dt2 in the flow direction. Other possible locations are at the underside of the airplane part or wing profile 77, and temperature measurements between the underside and the upper side, such as at Dt3 may be contemplated.

As schematically illustrated in FIG. 7a the output signals SDt1, SDt2 and SDt3 from the differential thermoelements shown, are conveyed to a computer 70 for at least a temporary storing and signal processing. These signals to computer 70 can comprise several measurement channels, for example corresponding to the curves or developments 61–64 in FIG. 6. Besides it is important that an output signal from point P3 that gives a measurement of absolute or reference temperature, is conveyed to computer 70. FIG. 7d shows more in detail how this reference temperature can be measured in point or region P3 by means of a resistance thermoelement Pt100. The measuring signal for absolute temperature has substantial significance for controlling the validity of the signal processing as far as temperature differences are concerned, since a range of temperatures essentially between 0° C. and −55° C. of the absolute temperature constitutes the range that in actual practice by and large implies that the method and the apparatus according to the invention are usable and useful.

The normal situation referred to above, i.e. the temperature differences existing in this situation, also necessarily are applied to or stored in computer 70. This is based on a number of different normal situations for the aircraft concerned, as discussed above. Based on programming principles being known per se, the computer 70 can then perform a correlation or comparison between later recorded temperature differences and those which apply to the normal situation concerned, in order to deliver indication, warning or alarm signals at risk of imminent ice formation. An indication or display unit 71 is shown in connection with computer 70 for receiving output signals therefrom for the purpose of presentation to the aircraft crew or pilot.

The so-called normal situation for the temperature distribution around the aircraft in dry air can be calculated beforehand, or measured in order to be stored in a database being programmed into computer 70.

On the background of the flight parameters (FlyPar in FIG. 7a) the expected values of the dry air temperature distribution are adjusted depending on the flight velocity, rudder excursion, motor power, flying altitude and loading situation. The system can be so structured that these parameters are continuously and automatically fed to computer 70, or they can be input manually by the crew.

Normally all modern aircrafts are equipped with instrumentation for the necessary measurements. An exception is the load situation that may vary from flight to flight as far as the payload is concerned.

The variable portion of the load thus is reduced to the amount of fuel being left at any time. This can be read from the fluel gauge of the aircraft.

The signal processing in computer 70 at one hand can be adapted to detect deviations in the level of the later recorded temperature differences compared to the values in the normal situation, and can be based on level deviations over and beyond a predetermined limiting value. Another possibility that as the case may be can be combined with what is just mentioned, consists in having the computer calculate the time derivative of the recorded and stored temperature differences, as a basis for detection and indication.

Figure 7B:
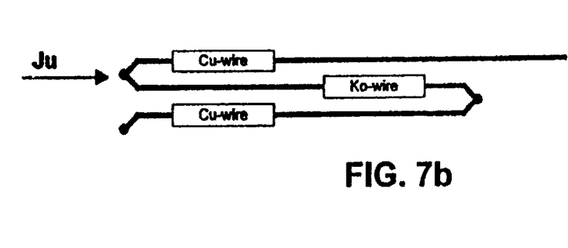
Figure 7C:
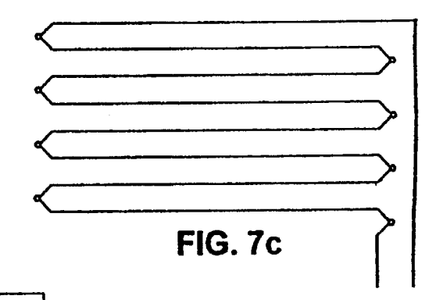
Figure 7D:
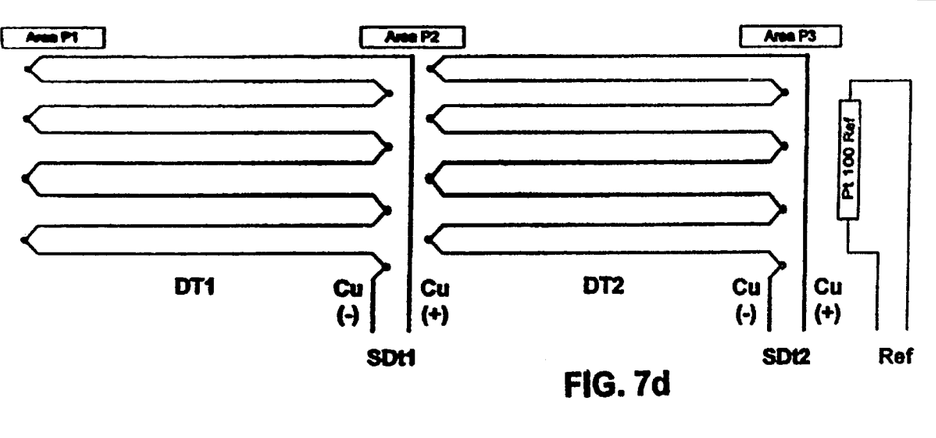

In FIGS. 7b and 7c a possible element structure is shown, where the materials employed are copper (Cu-wire) and constantan (Ko-wire) respectively, in every second of the wires. These are electrically interconnected in the points being indicated with a small sphere (see indication Ju). FIG. 7d shows a typical example of a complete instrumentation proposal for carrying out the method according to the invention.

One form of minimum instrumentation contains two absolute temperature sensors, i.e. based on any combination of two elements based on regions P1, P2, P3 and P4. Another form of minimum instrumentation consists of one differential thermoelement, such as Dt1, Dt2 or Dt3 i FIG. 7a, and one absolute temperature sensor (Ref. temp) in association with one of the sensitive ends of the differential thermoelement. With technology of today there is in practice obtained a higher accuracy when differential thermoelements are employed.

What is claimed is:

1. Method for detection of conditions involving a risk of ice formation on the surface of aircraft in movement, based on temperature measurement, characterized in that the surface temperature is measured with temperature measuring elements (Dt1, Dt2, Dt3) disposed in at least two surface points (P1, P2, P3, P4) having different air pressures, that a recording of the temperature difference between the points depending on time (61–64) is taken as a basis for the detection and a corresponding indication being presented to the aircraft pilot or crew, at least one temperature measuring element (Pt100) giving a measure of absolute temperature, that constitutes a check of the validity of the detection and the indication when the absolute temperature is between 0° C. and −55° C.; and the recording of the time curve or development comprises the temperature difference in a normal situation for the aircraft concerned and its velocity, altitude, climbing/ descending relationships as well as normal, dry air, and that subsequently recorded temperature differences are related to the temperature difference in the normal situation, for detection and indication of risk of ice formation.

2. Method for detection of conditions involving a risk of ice formation on the surfaces of aircraft in movement, based on temperature measurement, whereby the surface temperature is measured with temperature measuring elements (Dt1, Dt2, Dt3) disposed in at least two surface points (P1, P2, P3, P4), characterized in that one of the surface points (P2) is disposed downstream in relation to another surface point (P1) as seen in the general direction of air flow in the surface region at the points, that a recording of the temperature difference between the points depending on time (61–64) is taken as a basis for the detection and a corresponding indication being presented to the aircraft pilot or crew, that said time dependent recording comprises the temperature difference in a normal situation for the aircraft concerned and its velocity, altitude, climbing/ descending relationships as well as normal, dry air, that subsequently recorded temperature differences are related to the temperature difference in the normal situation, for detection and indication of risk of ice formation, and that at least one temperature measuring element (Pt100) is provided for giving a measure of absolute temperature, that constitutes a check of the validity of the detection and the indication when the absolute temperature is between 0° C. and −55° C.

3. Method according to claim 2, characterized in that deviations in the level of subsequently recorded temperature differences (61–64) in relation to the temperature difference in the normal situation, are taken as a basis for the detection and the indication, preferably on the basis of level deviations over and beyond a predetermined value.

4. Method according to claim 2, characterized in that a time derivative of recorded temperature differences (61–64) is taken as a basis for the detection and the indication.

5. Method according to claim 2, characterized in that at least one temperature measuring element is located at a stagnation point or region (P1) at the surface of the aircraft.

6. Method according to claim 2, characterized by the employment of temperature measuring elements that in pairs consist of a differential temperature measuring element (Dt1 and Dt2, respectively), and that an absolute temperature element (Pt100) is located adjacent to the differential temperature measuring element (P3).

7. Method according to claim 6, characterized by the employment of two or more differential temperature measuring elements (Dt1,Dt2,Dt3).

8. Method according to claim 2, characterized in that a relatively strong increase in the absolute temperature is used for warning about ice formation having started.

9. Apparatus for detection of conditions involving a risk of ice formation on the surface of aircraft in movement, based on temperature measurement, comprising:

at least two temperature measuring elements (Dt1, Dt2, Dt3) disposed at different surface points (P1, P2, P3, P4), one of the surface points (P2) being disposed downstream in relation to another surface point (P1) as seen in the general direction of air flow in the surface region at the points;

a recorder for taking time dependent recordings of a temperature difference between the points, the time dependent recordings including the temperature difference in a normal situation for the aircraft concerned and its velocity, altitude, climbing/descending relationships as well as normal, dry air; and a means for presenting to a pilot or crew an indication of a relationship between a currently recorded temperature difference between the points and the temperature difference in the normal situation, for detection and indication of risk of ice formation, wherein, at least one temperature measuring element (Pt100) is provided for giving a measure of absolute temperature, that constitutes a check of the validity of the detection and the indication when the absolute temperature is between 0° C. and −55° C.

10. Apparatus according to claim 9, characterized in that at least one temperature measuring element is located at a stagnation point or region (P1) at the surface of the aircraft.

11. Apparatus according to claim 9, characterized in that at least some temperature measuring elements in pairs consist of differential temperature measuring elements (Dt1, Dt2).

12. Apparatus according to claim 11, characterized by comprising two or more differential temperature measuring elements (Dt1,Dt2,Dt3).

13. Apparatus according to claim 9, characterized in that one or more temperature measuring elements is/are mounted underneath a heat conductive outer skin of the aircraft.

* * * * *